June 24, 1930.  H. D. STEVENS  1,768,335
MACHINE FOR WASHING TIRES, COATING AIR BAGS, OR THE LIKE
Filed June 21, 1924  4 Sheets-Sheet 1

INVENTOR.
HORACE D. STEVENS
BY
ATTORNEY.

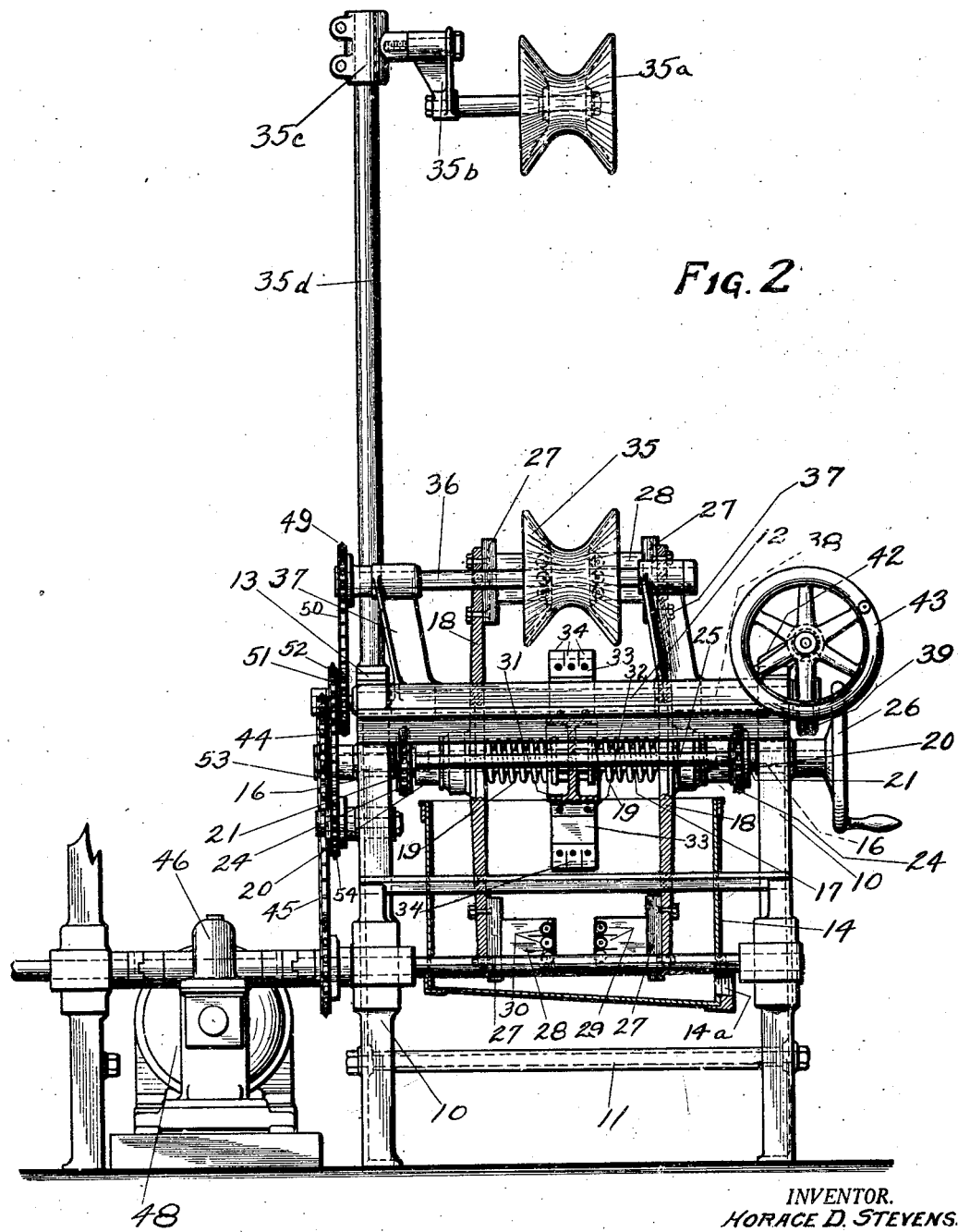

June 24, 1930. H. D. STEVENS 1,768,335
MACHINE FOR WASHING TIRES, COATING AIR BAGS, OR THE LIKE
Filed June 21, 1924 4 Sheets-Sheet 3
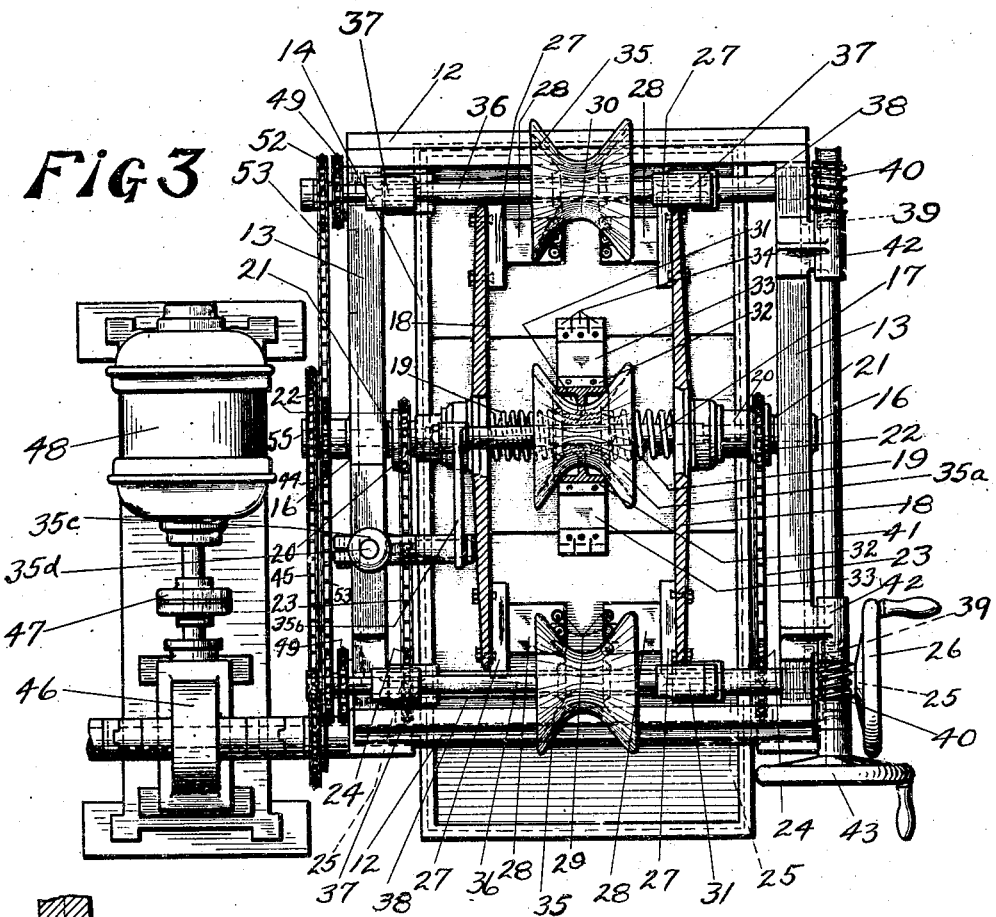
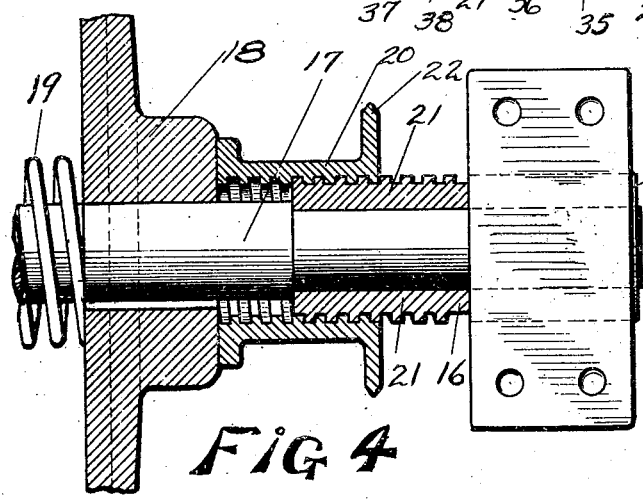
INVENTOR.
HORACE D. STEVENS
BY
ATTORNEY.

June 24, 1930. H. D. STEVENS 1,768,335
MACHINE FOR WASHING TIRES, COATING AIR BAGS, OR THE LIKE
Filed June 21, 1924 4 Sheets-Sheet 4
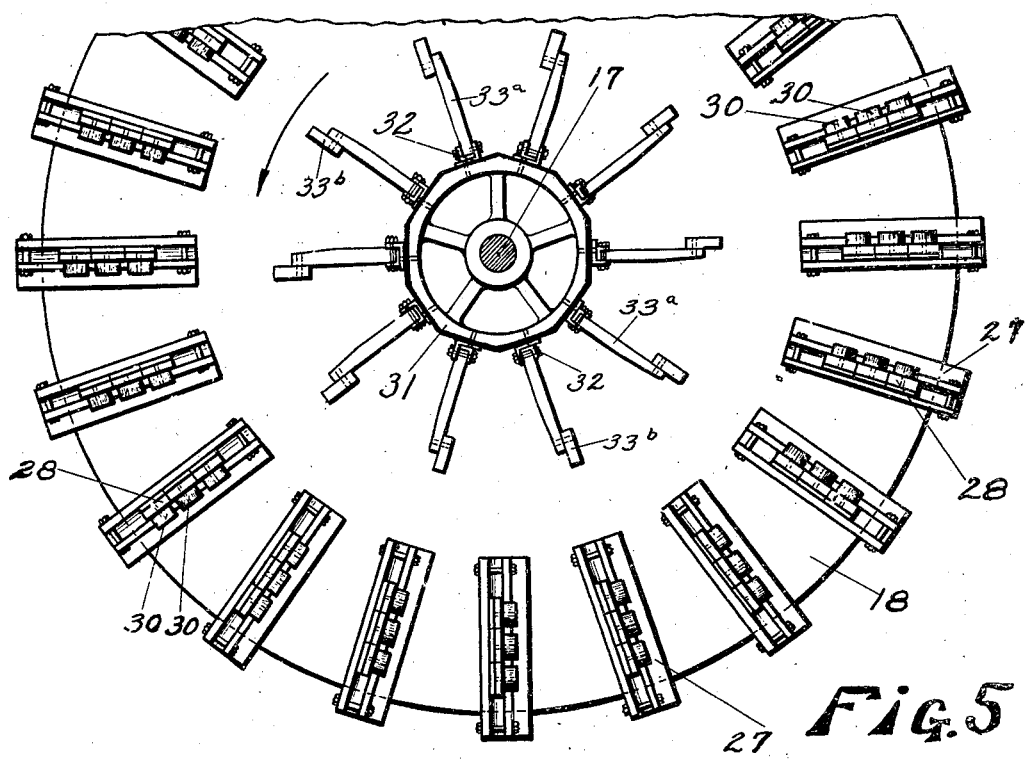
Fig. 5
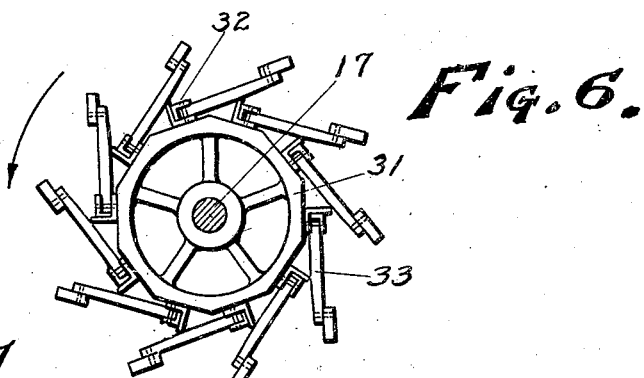
Fig. 6.
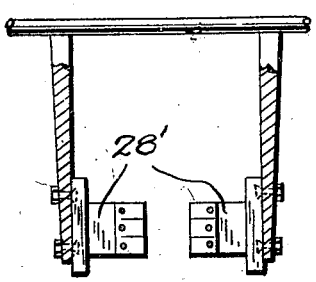
Fig. 7.
INVENTOR.
HORACE D. STEVENS
BY 
ATTORNEY.

Patented June 24, 1930

1,768,335

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

MACHINE FOR WASHING TIRES, COATING AIR BAGS, OR THE LIKE

Application filed June 21, 1924. Serial No. 721,481.

This invention relates to tire-washing or air-bag coating machines.

The purpose of the invention is to provide a machine adapted rapidly and efficiently to wash tires supplied thereto as they come from the vulcanizer, the machine being designed to be rapidly adjusted for different sizes of tires as the latter are mounted therein. The machine is also adapted with suitable modification if desired to apply a coating to annular air-bags which are employed in the vulcanization of cord tires, the air bags being buffed and recoated after a number of cures in order to renovate the same.

Heretofore, it has been the practice to wash tires by hand. This called for a large tire-washing department employing a large number of men. The machine of the invention has been designed to supplant the hand-washing process and accordingly to wash tires not only more efficiently but at great savings in labor and expense.

One object of the invention is to provide wipers or brushes adapted to rotate in a tank containing a cleaning liquid, such as a mixture of soapy water and gasoline, or a rubber cement, and adapted to engage the side walls, including the beads, and the tread of a tire mounted in proper relation to the wipers or to engage the sides and outer periphery of an air bag, the tire or bag being rotated on its supports.

Another object of the invention is to provide wipers and tire-supporting means relatively movable whereby tires or bags of various sizes can be brought into proper engagement with the wipers by a quick relative adjustment of the tire supporting members and the wipers as the tires are mounted in the machine.

Another object of the invention is to provide wipers for engaging the opposite side walls of the tire or bags which are relatively movable so as to be quickly adjusted for operation on tires or air bags of various sizes.

Another object of the invention is to provide improved tire or bag supporting and driving means adapted to rotate the tire or bag comparatively slowly, the driving means being also adapted to rotate the wipers comparatively rapidly in opposite direction to that of the tire or bag.

The above and other objects will be the more readily apparent after the following detailed description of the invention is read in connection with the accompanying drawings, it being understood that the invention is not limited to the specific structure shown or described or the specific uses mentioned to which it has been adapted.

Of the drawings:

Figure 2 is a front elevation thereof;

Figure 3 is a plan thereof;

Figure 4 is a detail illustrating the means for adjusting the side-wall wipers.

Figure 5 is an enlarged side elevation of the side wall wipers, the tread wipers and the mounts therefor; and Figure 6 is a side elevation of a modified form of tread wiper.

Figure 7 is a detail view illustrating a modified form of side-wall wiper.

Figure 1:
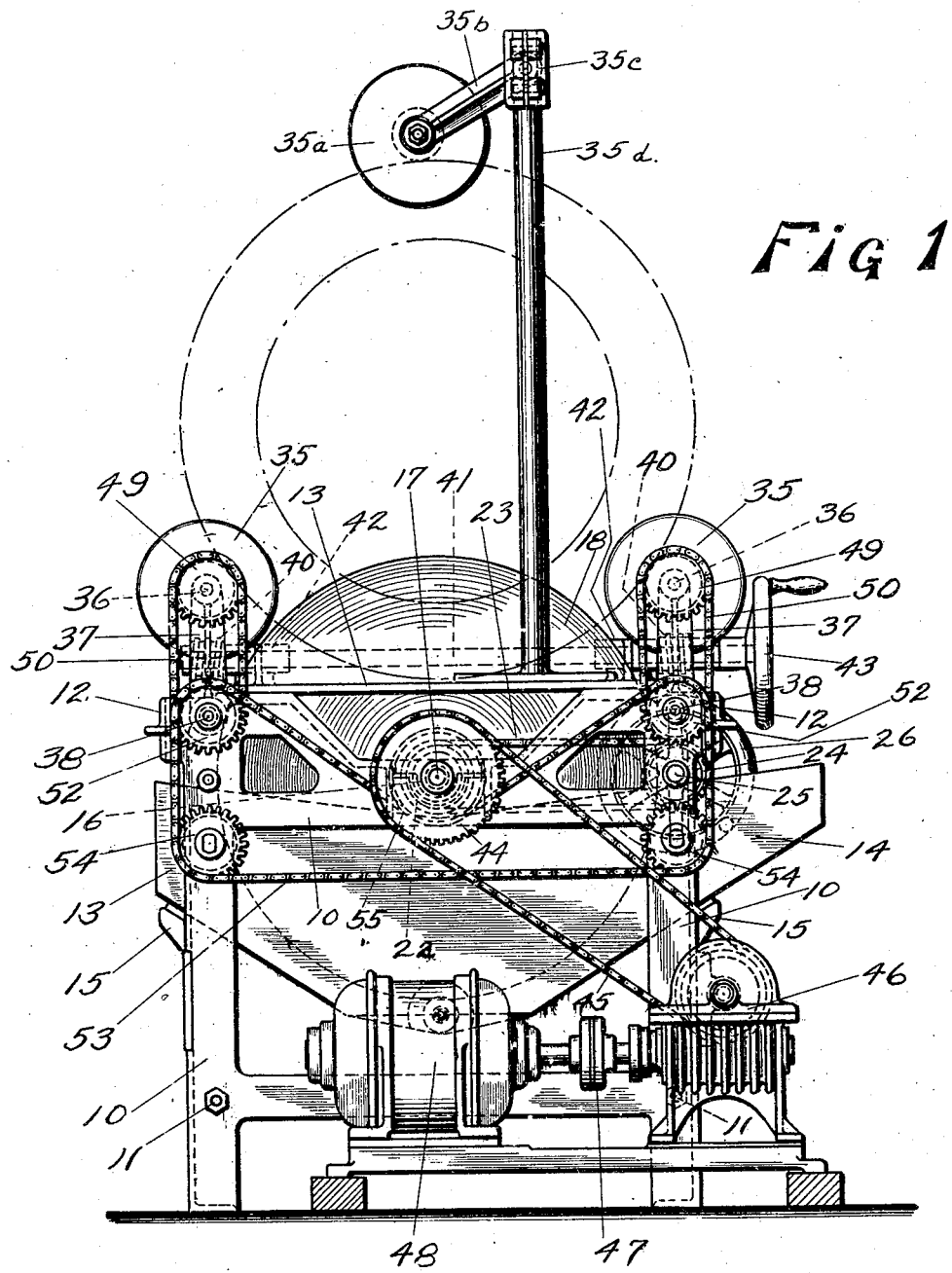
Figure 1 is a side elevation of a machine constructed according to the invention and adapted particularly for washing tires.

Referring to the drawings, 10, 10 are side frame members connected together by tie rods 11, 11, cross-pieces 12, 12 and cross-plates 13, 13 to form a machine frame on which is supported a tank 14, the latter being mounted on brackets 15, 15 extending between the members 10. The tank 14 has a downwardly inclined bottom (Figure 2) leading to a drain outlet 14ª.

Journaled in bearings 16, 16 supported on the members 10 is a shaft 17 on which are keyed or splined a pair of discs 18, 18 slidable on the shaft and urged apart by coil springs 19, 19 the inner ends of which are secured to the shaft.

The discs 18 are adapted to carry sidewall wipers later to be described, hence, they are adjustable toward each other against the action of springs 19 by collars 20, 20 (see Figure 4), the latter being adapted to engage the hubs of the discs 18, as shown, and being internally threaded so as to be screwthreadedly mounted on threaded sleeves 21, 21 integral with the bearings 16. Sleeve 21 and collar 20 on one side of the machine are reversely threaded from the sleeve 21 and collar 20 on the other whereby the collars may be simultaneously operated to urge discs 18 toward or from each other by sprockets 22, 22 on the collars 21, the sprockets have trained thereover chains 23, 23 which latter are also trained over sprockets 24, 24 on a common shaft 25 journaled between frame members 10 in the front of the machine and adapted to be manually rotated by hand-wheel 26.

The discs 18 each have a circumferential series of clamps 27, 27 bolted thereon (see Figure 5) in which are clamped side wall wipers 28, 28, the latter being formed of strips of rubber of suitable dimensions and slit inwardly toward the clamps to provide a plurality of fingers 29, 29 on which are secured discs 30, 30 of emery or other abrasive material which discs are adapted to wipe over the side walls of a tire to lightly buff off the dirt. The use of emery discs may of course be dispensed with when using the device for a coating machine.

Secured on the shaft 17 midway between the discs 18 is a central drum 31 on which are bolted clamps 32, 32 in which are secured tread wipers 33, 33, the latter including strips of rubber $33^a$, $33^a$ and outer strips of felt $33^b$, $33^b$, the latter being riveted on the rubber strips and being slit to provide a series of yielding fingers 34, 34 adapted to wipe over the tread of a tire or the outer periphery of an air bag. In using the device for coating, brushes in the form of felt strips similar to those marked $33^b$ may be secured on the side-wall wipers.

In Figure 6 is shown a form of central wiper in which the wipers 33 instead of being radially arranged are arranged tangentially, this arrangement being desirable for use on flat tread tires.

To the end that a tire may be mounted and driven in proper relation to the wipers, a pair of peripherally grooved tire supporting and driving rollers 35, 35 are mounted on shafts 36, 36 journaled on arms 37, 37 secured on rock shafts 38, 38 journaled between the frame members 10, the shafts 38 each having a worm gear 39 thereon (Figures 2 and 3), each in mesh with a worm 40 on a shaft 41 journaled in brackets 42, 42 and adapted to be manually rotated by hand-wheel 43, the latter being disposed adjacent hand-wheel 26 whereby the adjustments of the supporting and driving rollers 35 and of the side wall wipers 28 can be conveniently and quickly accomplished by a single attendant.

For supporting a tire or air bag in vertical position on the rollers 35, a roller $35^a$ is journaled on an arm $35^b$ pivoted on a bracket $35^c$ which is adjustable vertically on a standard $35^d$ mounted on one cross plate 13.

For driving the wipers a sprocket 44 is secured on the shaft 17 over which sprocket is trained a chain 45 driven through a suitable reduction 46 and flexible coupler 47 by a motor 48.

In order to drive the rollers 35 in all positions to which they may be adjusted, sprockets 49, 49 are secured on shafts 36 and have trained thereover chains 50, 50 which are in turn trained over sprockets 51, 51 (Figures 2 and 3) journaled on rock shafts 38 and which have drivingly secured thereto sprockets 52, 52. The sprockets 52 are adapted to be driven by a common chain 53 trained thereover and over idler sprockets 54, 54, the chain 53 being driven by a sprocket 55 on the shaft 17.

In operation, shaft 17, carrying the wipers, is driven continuously at a comparatively rapid rate, and shafts 36 carrying rollers 35 are driven at a somewhat slower rate and in opposite direction. The direction of rotation of the wipers will be counter clock-wise, as shown in Figure 5, so that the emery discs 30 will be effective on the sides of the tire. The tire is mounted, as shown in dotted line (Figure 1) on rollers 35, roller $35^a$ being permitted to lie on its upper surface. Hand-wheel 43 is then rotated to raise or lower the tire into proper engagement with the wipers, rotation of the shaft 41 by the hand-wheel causing the worms 40 to actuate the worm gears 39 to rock shafts 38 to move rollers 35 from or toward each other (one worm 40 being the reverse of the other worm 40). Thus the rollers 35 will be urged together or separated so that the amount which a tire will project downwardly between the discs 18 is adjusted to cooperate with tires or other torus-shaped articles of different major diameters, the adjustment being such that the tread wipers will engage the tread and the side-wall wipers will sweep entirely over the side walls from the tread to and around the beads.

To bring the side wall wipers into engagement with the side walls, hand-wheel 26 is rotated thereby rotating shaft 25 which drives chains 23 by sprockets 24, chains 23 in turn rotating sprockets 22 on collars 20, the latter accordingly moving from or toward each other along sleeves 21 to force discs 18 inwardly against springs 19 or to permit the springs to force the discs apart whereby the machine is adapted to operate on tires or other torus-shaped articles of different minor diameters.

The above-described adjustments are preserved so long as the same size tires are supplied to the machine, the adjustment for different sizes being quickly made when another lot is to pass through the machine or when the tires vary in size in succession as in the more usual case, the rapidity of the adjustment being such that the machine may efficiently operate under the latter condition.

Modifications of the invention, other than those disclosed herein, may be resorted to without departing from the spirit or scope of the appended claims.

What I claim is:

1. A machine for treating torus-shaped articles comprising a tank, a plurality of traveling wipers adapted to pass through the tank, said wipers being adapted to engage opposite side-walls of the article, means for adjusting said wipers from and toward each other, and means for supporting and circumferentially driving the article in engagement with the wipers.

2. A machine for treating annular articles comprising a tank, traveling wipers adapted to pass through the tank, means for supporting and circumferentially driving the article, and means for relatively adjusting the wipers and the first means.

3. A machine for treating articles of torus-shape comprising a tank, a plurality of wipers traveling through the tank arranged to engage the side walls of the article, means for adjusting said wipers toward and from each other to treat articles of various minor diameters, and means for supporting and circumferentially driving the articles, said means and said wipers being relatively adjustable to treat articles of various major diameters.

4. A machine for treating articles of torus-shape comprising a tank, a plurality of wipers traveling through the tank, said wipers including a wiper for engaging the outer periphery of the article and a pair of opposed wipers for engaging the side walls of the article, said last-named wipers being relatively adjustable to engage articles of various minor diameters.

5. A machine for treating articles of torus-shape comprising a tank, a plurality of wipers traveling through the tank, said wipers including a wiper for engaging the outer periphery of the article, a pair of opposed wipers for engaging the side walls of the article, said last-named wipers being relatively adjustable to engage articles of various minor diameters, and means for supporting and circumferentially driving the articles, said means and said wipers being relatively adjustable to treat articles of various major diameters.

6. In a machine of the class described, traveling wipers for engaging articles of torus-shape including a wiper for engaging the outer periphery of the article and a pair of opposed wipers movable toward or from each other for engaging the side walls of the article.

7. In a machine of the class described, rotary wipers for engaging the sides of annular articles including a pair of slidably mounted wipers, yielding means for urging the wipers apart, and means engaging the wipers for moving the latter together.

8. In a machine of the class described, rotary wipers for engaging annular articles including a pair of wipers slidable on a shaft, a wiper secured on the shaft between the pair of wipers, yielding means for urging the pair of wipers apart, and means engaging the wipers for moving the latter together.

9. Apparatus of the class described comprising means for supporting and circumferentially driving an annular article in a vertical plane, a tank, and wipers traveling through the tank and out of the tank into engagement with the article outside of the tank.

10. Apparatus of the class described comprising means for supporting and circumferentially driving an article of torus-shape in a vertical position, a tank beneath said means and rotary wipers partly submerged in the tank and engageable with the outer periphery and side-walls of the article at a point at which they are not submerged.

11. Apparatus of the class described comprising a pair of rollers for supporting a circumferentially driven annular article, wipers adapted to engage the portion of the article between the rollers, and means for moving the rollers toward or from each other to raise or lower said portion of the article with respect to the wipers.

12. Apparatus of the class described comprising a pair of rollers adapted to support a circumferentially driven annular article, a pair of wipers engageable with the opposite side-walls of that portion of the article between the rollers, and means for moving the rollers toward or from each other to raise or lower said portion of the article between the wipers.

13. Apparatus of the class described comprising a pair of rollers adapted to support a circumferentially driven annular article, a pair of wipers adjustable toward or from each other engageable with the opposite side-walls of that portion of the article between the rollers, and means for moving the rollers toward or from each other to raise or lower said portion of the article between the wipers.

14. Apparatus of the class described comprising a pair of rollers for supporting a circumferentially driven annular article, a pair of wipers engageable with opposite sides of the article, means for moving the rollers toward or from each other, and means for moving the wipers toward or from each other.

15. Apparatus of the class described comprising a pair of rollers for supporting a circumferentially driven annular article, a pair of wipers engageable with opposite sides of the article, means for moving the rollers toward or from each other, means for moving the wipers toward or from each other, manual means for operating the wiper adjusting means, and manual means for operating the roller moving means, both said manual means being disposed in close proximity to each other so as to be simultaneously operable by an attendant.

HORACE D. STEVENS.